(No Model.)
W. & R. A. LONSDALE.
CURLING IRON.
No. 484,743. Patented Oct. 18, 1892.
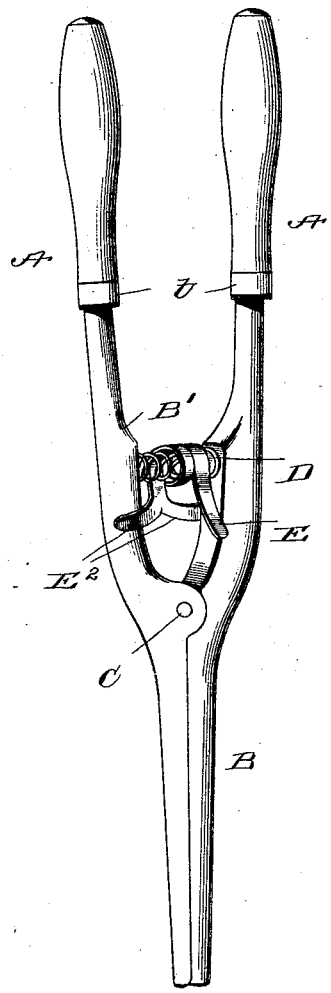
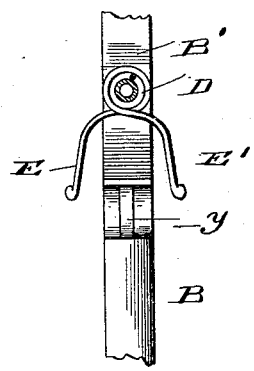
Witnesses
John Irvine
Bruce S. Elliott
Inventors
William Lonsdale and
Richard A. Lonsdale
by Dyrenforth & Dyrenforth
Attorneys

UNITED STATES PATENT OFFICE.

WILLIAM LONSDALE AND RICHARD A. LONSDALE, OF CHICAGO, ILLINOIS.

CURLING-IRON.

SPECIFICATION forming part of Letters Patent No. 484,743, dated October 18, 1892.

Application filed October 5, 1891. Serial No. 407,682. (No model.)

*To all whom it may concern:*

Be it known that we, WILLIAM LONSDALE and RICHARD A. LONSDALE, citizens of the United States, residing at Chicago, in the county of Cook and State of Illinois, have invented a new and useful Improvement in Curling-Irons, of which the following is a specification.

Our invention relates to an improvement in curling-irons, and has for its object to provide a curling-iron with a convenient means for hanging it over a lamp for the purpose of heating it.

Our invention consists, further, in providing a supporting means normally at a point centrally between the handles, so that whether in use or not it shall be in a position to afford no obstruction to the use of the iron.

In the drawings, Figure 1 illustrates in central longitudinal section a broken part of the curling-iron, showing the manner of applying a hook to be sustained at all times between the handles; and Fig. 2 is a view in perspective of a modified form of the hook shown in Fig. 1.

A represents the handles, and B the jaws, of the curling-iron. The form of curling-iron illustrated in the drawings is that in which the jaws are pivoted together through the medium of a pin C, and the handle for each jaw is attached to the inner extension of the latter, as indicated at *t*. A spring D extends between the irons at the part B' thereof, the normal tendency of which is to keep the jaws closed.

In Fig. 1 the spring D serves as a support for the hook, which comprises a strip of metal around the spring and continued into the two forward-projecting ends E E', each being sufficiently long to extend beyond the junction of the two jaws B. Under this construction either hook E E' may serve to support the curling-iron on the lamp-chimney, the other hook serving, by engagement with the part *y* of the iron, to check the outward movement of the hook E E'. It is, in fact, a double hook projecting from each side of the curling-iron and parallel with and away from the body of the latter, either hook serving to prevent the other when in use from revolving too far on the pivot. In Fig. 2 the hook is hung upon the spring, as in Fig. 1, but the opposite end of the strip which forms the hook is brought back to the same side and divided into a fish-tail $E^2$, one part thereof on one side of one jaw and the other on the opposite side of the other jaw, which serves to retain the hook normally at all times in the same position.

What we claim as new, and desire to secure by Letters Patent, is—

1. A curling-iron provided with a sustaining-hook supported at a point midway between the handles to project from the face thereof, substantially as described.

2. A curling-iron provided with a sustaining-hook supported at a point midway between the handles, said hook formed at one end into the hook portion proper and at its other end divided into a fish-tail having one part thereof on one side of one jaw and the other on the opposite side of the other jaw, whereby the hook is maintained normally at all times in the same position, substantially as described.

WILLIAM LONSDALE.
RICHARD A. LONSDALE.

In presence of—
M. J. FROST,
J. N. HANSON.